United States Patent [19]
Li et al.

[11] Patent Number: 5,630,021
[45] Date of Patent: May 13, 1997

[54] HAMMING NEURAL NETWORK CIRCUIT

[75] Inventors: Zhi-Jian Li; Bing-Xue Shi; Bin-Qiao Li, all of Beijing, China

[73] Assignee: United Microelectronics Corp., Hsinchu, Taiwan

[21] Appl. No.: 316,135

[22] Filed: Sep. 30, 1994

[51] Int. Cl.$^6$ ................................................ G06K 9/00
[52] U.S. Cl. ........................................................... 395/24
[58] Field of Search ...................................... 395/24, 27

[56] References Cited

U.S. PATENT DOCUMENTS

| | | | |
|---|---|---|---|
| 4,980,583 | 12/1990 | Dietz | 326/17 |
| 5,049,758 | 9/1991 | Mead et al. | 307/246 |
| 5,059,814 | 10/1991 | Mead et al. | 307/201 |
| 5,146,106 | 9/1992 | Anderson et al. | 307/246 |
| 5,248,873 | 9/1993 | Allen et al. | 250/208.1 |
| 5,268,684 | 12/1993 | Allen et al. | 341/75 |
| 5,331,215 | 7/1994 | Allen et al. | 395/24 |
| 5,361,311 | 11/1994 | Wilson | 382/156 |
| 5,537,512 | 7/1996 | Hsia | 395/24 |

OTHER PUBLICATIONS

IEEE ASSP Magazine, pp. 4–22, Apr. 1987 entitled "An Introduction to Computing with Neural Nets", by Richard P. Lippmann.
Gomez–Castaneda et al., VLSI Hamming Neural Net Showing Digial Decoding Jun. 1993.
Robinson et al., A Modular CMOS Design of a Hamming Network Jul. 1992.
Robinson et al, A Modular VLSI Design of a CMOS Hamming Network Apr. 1991.
Grant et al., Synthesis of a Class of Artificial Neural Network . . . 1991.
Zhong, An Analog Cell Library Useful for Artificial Neural Networks 1990.
Grant, A High Speed Integrated Hamming Neural Classifier 1994.
CMOS Circuit Design of Programmable Neural Net Classifier of Exclusive Classes Aug. 1989.
He et al., A High Density and Low Power Charge Based Hamming Network Mar. 1993.
Gomez–Castaneda, Integrated Circuit for Hamming Neural Net 1994.

*Primary Examiner*—Robert W. Downs
*Assistant Examiner*—Jeffrey Smith
*Attorney, Agent, or Firm*—Curtis, Morris & Safford, P.C.

[57] ABSTRACT

A Hamming neural network circuit is provided with N binary inputs and M exemplar template outputs, and has a template matching calculation subnet and a winner-take-all subnet. The template matching calculation subnet includes M first neurons in which M exemplar templates are stored respectively. Each first neuron includes N pull-up and pull-down transistor pairs connected in parallel with each other, and connected to and controlled by the N binary inputs, respectively, so that the M first neurons generate M template matching signals depending on the matching degrees between the N binary inputs and the M exemplar templates. The winner-take-all subnet includes M second neurons, each having a template competition node, a load element connected between a power source and the template competition node, and a competition circuit connected between the template competition node and ground. The M template competition nodes are connected to the M template matching signals respectively for generating the M exemplar template outputs. The competition circuit of each second neuron includes M −1 parallel-connected transistors controlled respectively by the template competition nodes of all second neurons except the template competition node of itself so that the template competition node connecting with the largest template matching signal is eventually at a relatively high voltage level, and the other template competition nodes are at a relatively low voltage level, after competition.

5 Claims, 5 Drawing Sheets

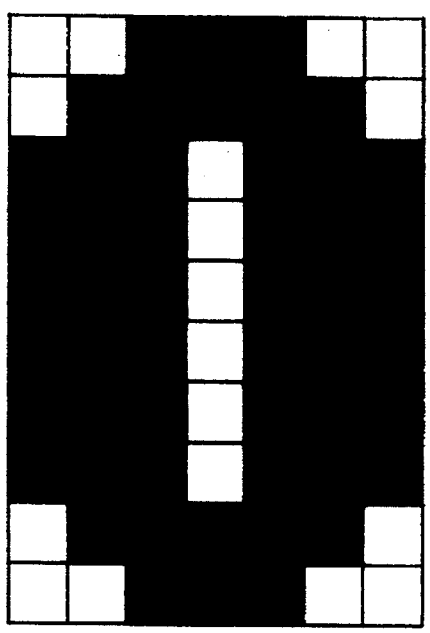
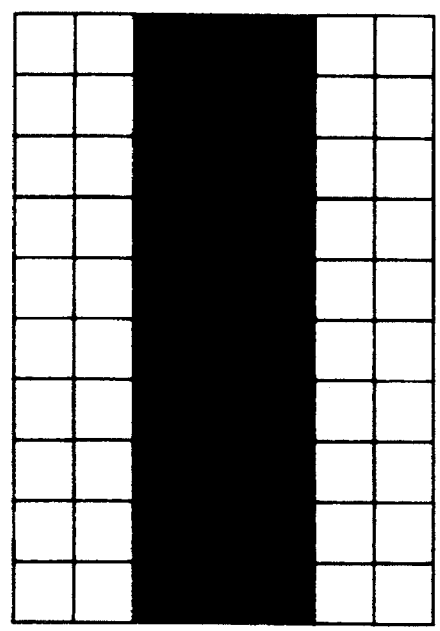
FIG. 2a
FIG. 2b
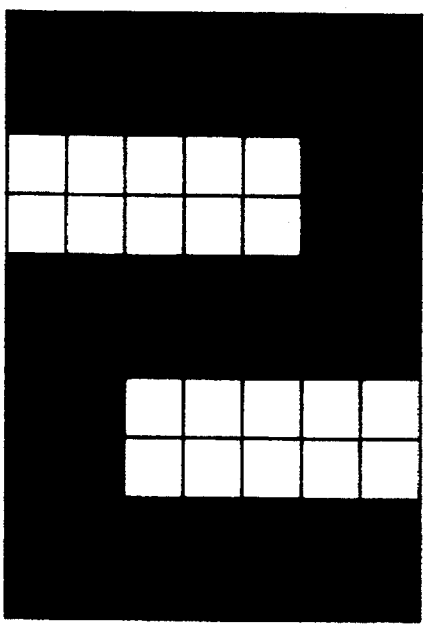
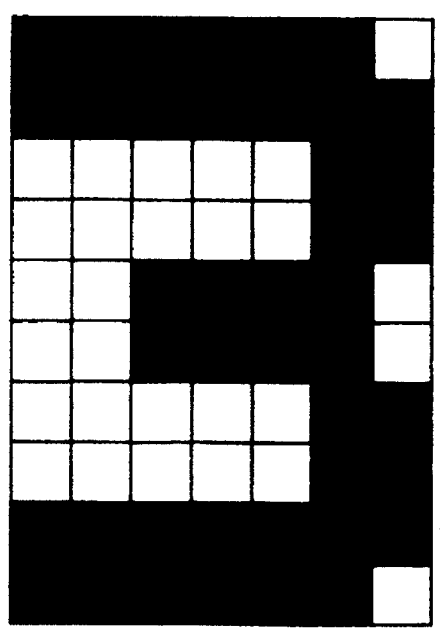
FIG. 2c
FIG. 2d

HAMMING NEURAL NETWORK CIRCUIT

BACKGROUND OF THE INVENTION

The present invention relates to a Hamming neural network circuit, and more particularly to an analog integrated circuit of a Hamming neural network which can be fabricated in CMOS (Complementary-Metal-Oxide-Semiconductor) technology.

Artificial neural network models have been studied for many years in the hope of achieving human-like performance in the fields of speech and image recognition. Now the main research method in this field is still using software to simulate some models or realize some algorithms. Although this research method can solve many problems, it is not suitable for some applications requiring real-time processing such as some image and speech recognition applications. The modern VLSI (Very-Large-Scale-Integration) technology has made it possible to fabricate more practicable artificial neural network chip. Using digital logic circuit can not realize really full parallel processing. The artificial neural network realized by analog integrated circuit have full parallel processing capability and other inherent advantages of biological neural networks.

The literature "An Introduction to Computing with Neural Nets", Richard P. Lippmann, IEEE ASSP Magazine, pp. 4–22, April, 1987, provides an introduction to the field of artificial neural networks by reviewing six important neural network models that can be used for pattern classification. As described in Lippmann's literature, these networks are highly parallel building blocks that illustrate neural-network components and design principles and can be used to construct more complex systems. One of the six neural network models is the Hamming network which is a neural network implementation of the optimum classifier for binary patterns corrupted by random noise. The structural model of a feed-forward Hamming network maximum likelihood classifier for binary inputs corrupted by noise is described in FIG. 6 of Lippmann's literature. The Hamming network is a two-layer network, and implements the optimum minimum error classifier when bit errors are random and independent. The lower subnet shown in Lippmann's FIG. 6 calculates N minus the Hamming distance to M exemplar patterns. The upper MAXNET subnet selects that node with the maximum output. All nodes use threshold-logic nonlinearities where it is assumed that the outputs of these nonlinearities never saturate.

The operation of the Hamming network is described in Box 2 of Lippmann's literature. Weights and thresholds are first set in the lower subnet such that the matching scores generated by the outputs of the middle nodes of FIG. 6 are equal to N minus the Hamming distance to the exemplar patterns. These matching scores will range from 0 to the number of elements in the input (N) and are highest for those nodes corresponding to classes with exemplars that best match the input. Thresholds and weights in the MAXNET subnet are fixed. All thresholds are set to zero and weights from each node to itself are 1. Weights between nodes are inhibitory with a value of $-\epsilon$ where $\epsilon < 1/M$.

After weights and thresholds have been set, a binary pattern with N elements is presented at the bottom of the Hamming network. It must be presented long enough to allow the matching score outputs of the lower subnet to settle and initialize the output values of the MAXNET. The input is then removed and the MAXNET iterates until the output of only one node is positive. Classification is then complete and the selected class is that corresponding to the node with a positive output.

SUMMARY OF THE INVENTION

The primary object of the present invention is to provide a Hamming neural network circuit which can realize the Hamming network model, and is very suitable for being fabricated in CMOS technology.

In accordance with the present invention, a Hamming neural network circuit having N binary inputs and M exemplar template outputs, comprises:

a template matching calculation subnet including M first neurons in which M exemplar templates are stored respectively, each first neuron being consisted of N pull-up and pull-down transistor pairs connected in parallel with each other, the N pull-up and pull-down transistor pairs of each first neuron being connected to and controlled by the N binary inputs, respectively, to operate in the nonsaturation region during a first time interval so that the M first neurons generate M template matching signals depending on the matching degrees between the N binary inputs and the M exemplar templates stored in the M first neurons; and a winner-take-all subnet including M second neurons, each having a template competition node, a load element connected between a power source and the template competition node, and a competition circuit connected between the template competition node and ground; the M template competition nodes being connected to the M template matching signals respectively during a second time interval for generating the M exemplar template outputs, and the competition circuit of each second neuron being consisted of M−1 parallel-connected transistors controlled respectively by the template competition nodes of all second neurons except the template competition node of itself so that the template competition node connecting with the largest template matching signal is eventually at a relatively high voltage level, and the other template competition nodes are at a relatively low voltage level, after competition.

According to one feature of the present invention, the M template competition nodes are connected with each other during the first time interval in order to balance their voltage levels before competition, and are disconnected from each other during the second time interval when competition proceeds.

According to another feature of the present invention, the competition circuit of each second neuron further includes an additional parallel-connected transistor adapted to be controlled by an adjusting threshold voltage, and the winner-take-all subnet further includes an additional second neuron acting as a threshold neuron. The template competition node of the threshold neuron is connected to the adjusting threshold voltage during the second time interval, and the M parallel-connected transistors of the threshold neuron are controlled respectively by the template competition nodes of all other second neurons, so that all exemplar template outputs are eventually at the relatively low voltage level, after competition, if the adjusting threshold voltage is higher than the voltages of all template matching signals.

According to further feature of the present invention, the threshold voltages of each pull-up and each pull-down transistors in the first neurons are individually preset depending upon the corresponding exemplar templates, and parts of the binary inputs are selectively inverted in each first neuron, depending upon its corresponding exemplar template. The load elements in the second neurons are MOS transistors adapted to be controlled by a bias voltage.

BRIEF DESCRIPTION OF THE DRAWINGS

The present invention can be more fully understood by reference to the following description and accompanying drawings, which form an integral part of this application:

FIGS. 2a through 2e illustrate five exemplar patterns or templates of Arabic numerals "0" to "4", constructed by 70 (7×10 array) binary pixels;

DETAILED DESCRIPTION OF THE PREFERRED EMBODIMENTS

Figure 1:
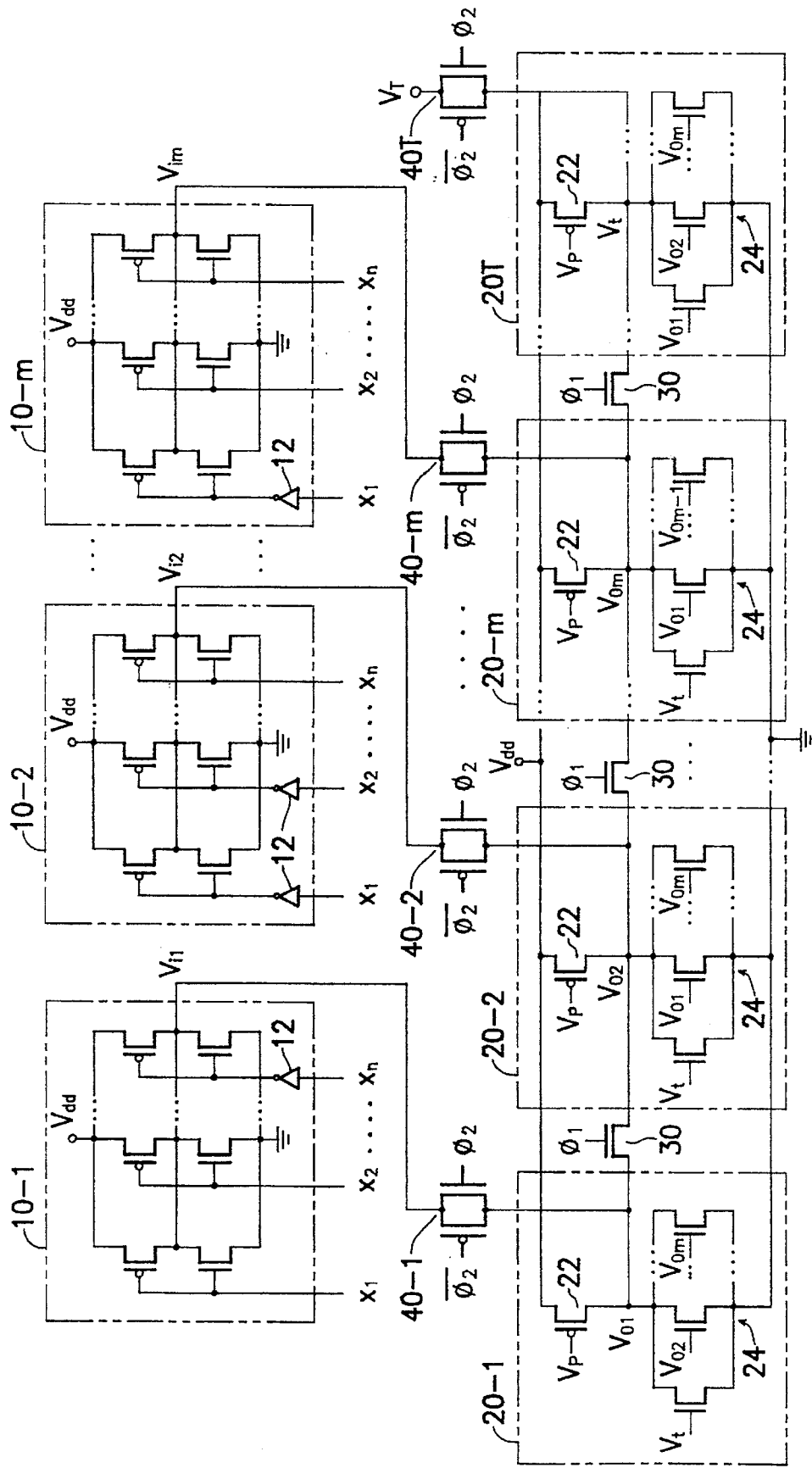
FIG. 1 is a schematically electrical circuit diagram of a Hamming neural network according to one preferred embodiment of the present invention.

Referring now to FIG. 1, there is shown a Hamming neural network circuit suitable to be fabricated in CMOS technology, according to one preferred embodiment of the present invention. The Hamming neural network circuit includes a template matching calculation subnet consisted of M first neurons 10-1 through 10-m; and a winner-take-all subnet consisted of M second neurons 20-1 through 20-m and a threshold neuron 20T. The first neurons 10-1 through 10-m are connected to the second neurons 20-1 through 20-m via M switch circuits 40-1 through 40-m, respectively. The threshold neuron 20T is connected to a threshold voltage $V_T$ via an additional switch circuit 40T.

Figure 2E:
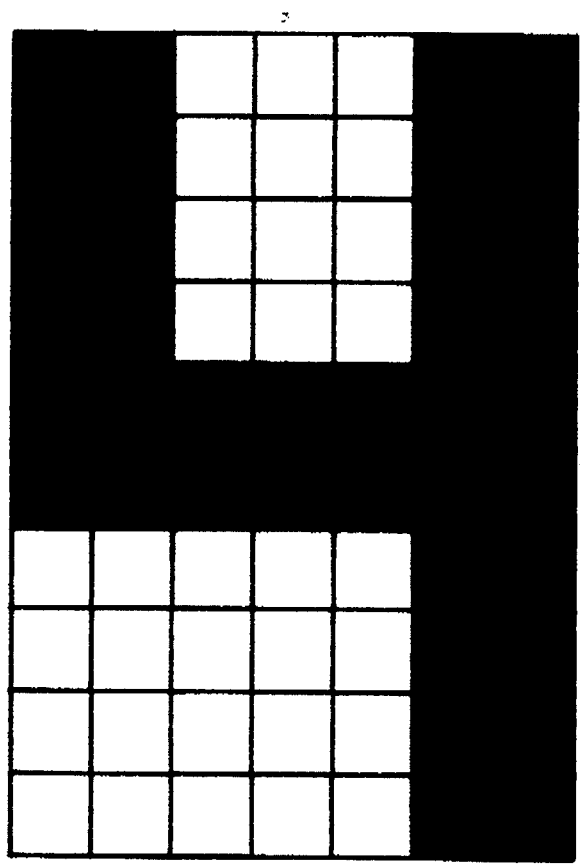

As known, the Hamming neural network circuit can be used for speech and image recognitions, and its inputs are binary signals. As shown in FIG. 1, the Hamming neural network circuit has N binary inputs $x_1$ through $x_n$, and M exemplar template outputs $V_{o1}$ through $V_{om}$. The M exemplar templates or patterns can be determined and designed by statistics and analysis. Referring to FIG. 2, there is shown five exemplar templates or patterns of Arabic numerals "0" to "4" consisted of 7×10 array of binary pixels, i.e. white and black pixels, just for easy understanding of the present invention. In this case, the number N is 70, and the number M is 5. The white pixel may be represented by a logic "0" signal while the black pixel may be represented by a logic "1" signal. The unknown pattern containing 70 binary pixels is inputted into the Hamming neural network circuit via the binary inputs $x_1$ through $x_n$, and the Hamming neural network circuit determines which one of the M exemplar templates is most representative of the unknown pattern by generating a logic "1" signal at the corresponding exemplar template output and a logic "0" signal at the other exemplar template outputs.

Figure 4:
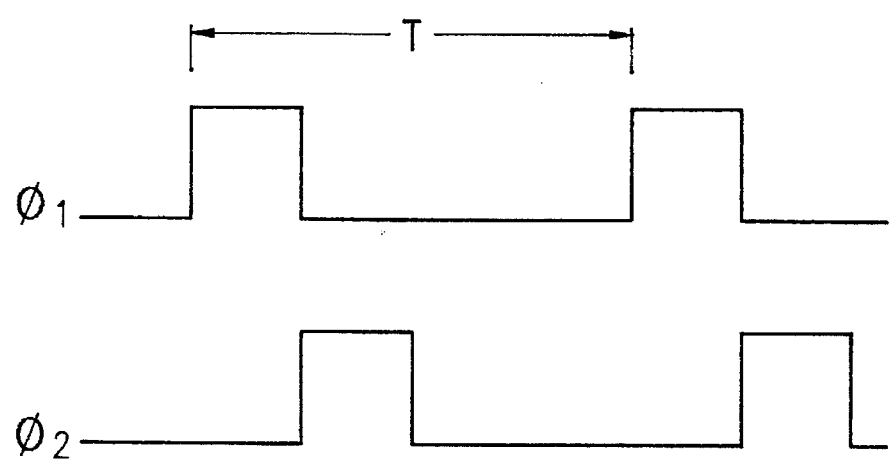
FIG. 4 illustrates a timing chart of two clock signals used in the Hamming neural network circuit of FIG. 1.

Each first neuron 10-1~10-m includes N pull-up and pull-down transistor pairs connected in parallel with each other and between a power source $V_{dd}$ and ground. The N pull-up and pull-down transistor pairs of each first neuron 10-1~10-m are controlled by the N binary inputs $x_1$ through $x_n$ respectively. In this embodiment of the present invention, the pull-up transistors are PMOS (P-channel Metal-Oxide-Semiconductor) transistors, and the pull-down transistors are NMOS (N-channel MOS) transistors. The drain electrodes of PMOS pull-up and NMOS pull-down transistors of each first neuron 10-1~10-m are connected together to generate a template matching signal $V_{i1}$~$V_{im}$ depending on the matching degree between the N binary inputs $x_1$ through $x_n$ and the corresponding exemplar template. After the exemplar templates are determined and designed, the M exemplar templates are "stored" in the M first neurons 10-1~10-m respectively. The "storage" of the exemplar templates can be achieved by appropriately designing the threshold voltages of all pull-up and pull-down transistors in the corresponding first neurons so that the voltage levels of the template matching signals $V_{i1}$~$V_{im}$ are determined by the matching degrees between the N binary inputs $x_1$ through $x_n$ and the exemplar templates. Larger matching degree will cause larger template matching signal, and vice versa. If an input unknown pattern matches perfectly with an exemplar template stored in the corresponding first neuron, an maximum output voltage level $V_{dd}$ can be obtained at the corresponding template matching output. It should be understood by those skilled in the art that all PMOS pull-up and NMOS pull-down transistor pairs are designed to operate in the nonsaturation region. Since the exemplar templates all contain white (e.g. represented by logic "0") and black (e.g. represented by logic "1") pixels, the expected logic "1" inputs in respective first neurons 10-1~10-m are connected to the pull-up and pull-down transistor pairs via inverters 12, as shown in FIG. 1. As known in the art, the unknown binary pattern with N elements must be presented at the inputs $x_1$~$x_n$ long enough to allow the template matching signals $V_{i1}$~$V_{im}$ of the template matching calculation subnet to settle and initialize the exemplar template output values of the winner-take-all subnet. In this embodiment of the present invention, the unknown pattern is presented at the binary inputs during a first time interval $\phi_1$ as shown in FIG. 4.

The template matching signals $V_{i1}$~$V_{im}$ of the template matching calculation subnet are connected to the exemplar template outputs or template competition nodes $V_{o1}$~$V_{om}$ of the winner-take-all subnet via M switch circuits 40-1 through 40-m respectively, as shown in FIG. 1. Each switch circuit 40-1~40-m, or 40-T includes a PMOS transistor and an NMOS transistor connected in paralled with each other. The PMOS transistors of the switch circuits are controlled by a clock signal $\overline{\phi_2}$, and the NMOS transistors of the switch circuits are controlled by the clock signal $\phi_2$. The clock signal $\phi_2$ is shown in FIG. 4. The parallel-connected PMOS and NMOS transistors of the switch circuits 40-1 through 40-m are used to eliminate the threshold voltage drop in order not to decrease the voltage levels of the template matching signals $V_{i1}$~$V_{im}$ because the template matching signals may be very small. During the second time interval $\phi_2$, the template matching signals are inputted into the winner-take-all subnet.

The second neurons 20-1 through 20-m and the threshold neuron 20-T have the same circuit structure, and each includes a load element 22 connected between the power source $V_{dd}$ and the template competition node $V_{o1}$~$V_{om}$ or $V_t$, and a competition circuit 24 connected between the template competition node $V_{o1}$~$V_{om}$ or $V_t$ and ground. The load elements 22 may be PMOS transistors controlled by a bias voltage $V_p$ to act as a resistance element. The competition circuits 24 all include M NMOS transistors connected in parallel with each other and controlled respectively by the template competition nodes $V_{o1}$~$V_{om}$ and $V_t$ of all second neurons 20-1 through 20-m and the threshold neuron 20-T except the template competition node of itself.

During the second time interval $\phi_2$, the inputted template matching signals $V_{i1}$ through $V_{im}$ and the threshold voltage $V_T$ compete with each other in the winner-take-all subnet. After competition, the largest singal eventually becomes a relatively high voltage signal, and the other signals eventually become relatively low voltage signal. More specifically, suppose the voltage level of the template matching signal $V_{i1}$ is larger than those of the other template matching signals and the threshold voltage. The NMOS transistors in the competition circuits 24 of the second neurons 20-2 through 20-m and the threshold neuron 20-T which are controlled by the template matching signal $V_{i1}$, are much turned on, and thus the voltage levels of the template competition nodes $V_{o2}$~$V_{om}$ and $V_t$ are pulled down. The NMOS transistors in the competition circuit 24 of the second neuron 20-1 which are controlled by the template competition nodes $V_{o2}$~$V_{om}$ and $V_t$ respectively, are then more turned off, and thus the voltage level of the template competition node $V_{o1}$ is pulled up. Then, the voltage levels of the template competition nodes $V_{o2}$~$V_{om}$ and $V_t$ are further pulled down because the NMOS transistors controlled by the template competition node $V_{o1}$ are more turned on. Eventually, the template competition nodes $V_{o1}$ is at a relatively high voltage level, for example near the power source $V_{dd}$, and the other template competition nodes $V_{o2}$~$V_{om}$ and $V_t$ are at a relatively low voltage level, for example near the ground. The Hamming neural network circuit of the present invention then determines that the unknown input pattern is the exemplar template or pattern stored in the first neuron 10-1.

The threshold voltage $V_T$ is adjustable, and is used to reject the recognition if the template matching signals $V_i 1$ through $V_{im}$ are all smaller than the threshold voltage $V_T$. In this case, the template competition node $V_t$ is eventually at a relatively high voltage level, and the other template competition nodes $V_{o1}$~$V_{om}$ are eventually at a relatively low voltage level. The Hamming neural network circuit of the present invention then determines that a "no match" result occurs.

Referring to FIG. 1, an NMOS balance/isolation transistor 30 is connected between every two adjacent template competition nodes $V_{o1}$~$V_{om}$ and $V_t$. The NMOS balance/ isolation transistors 30 are controlled by the clock signal $\phi_1$ as shown in FIG. 4, and are used to balance the voltage levels of all template competition nodes $V_{o1}$~$V_{om}$ and $V_t$ during the first time interval $\phi_1$, i.e. before competition, and to isolate all template competition nodes $V_{o1}$~$V_{om}$ and $V_t$ from each other during the second time interval $\phi_2$, i.e. during competition. The period of time T shown in FIG. 4 indicates one recognition cycle.

The Hamming neural network circuit of the present invention has been implemented by single layer metal CMOS technology. In order to reduce the power dissipation, the gate length of the MOS transistors in the template matching calculation subnet are designed larger than the gate width. In one preferred embodiment, the PMOS transistors in the template matching calculation subnet have a gate length of about 20 microns, and a gate width of about 15 microns. The NMOS transistors in the template matching calculation subnet have a gate length of about 20 microns, and a gate width of about 10 microns. The gate length and width of the NMOS transistors in the winner-take-all subnet is about 5 microns and about 20 microns respectively. A CMOS inverter is further added to each exemplar template output to increase the driving capacity and avoid the effect of external load on the resolution accuracy of the winner-take-all subnet.

The operation speed of the template matching calculation subnet corresponds approximately the delay time of one logic gate. The speed and resolution accuracy of the whole Hamming neural network mainly depends on the winner-take-all subnet, so the winner-take-all subnet is tested thoroughly.

Figure 3A:
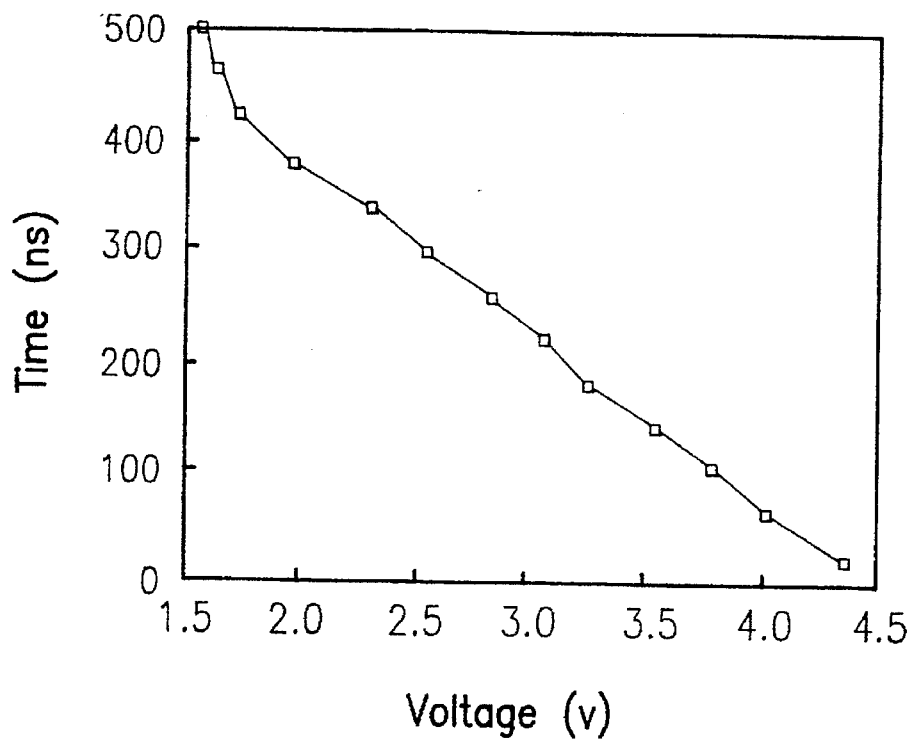
FIGS. 3a through 3c illustrate the experimental results for the Hamming neural network circuit shown in FIG. 1.
Figure 3B:
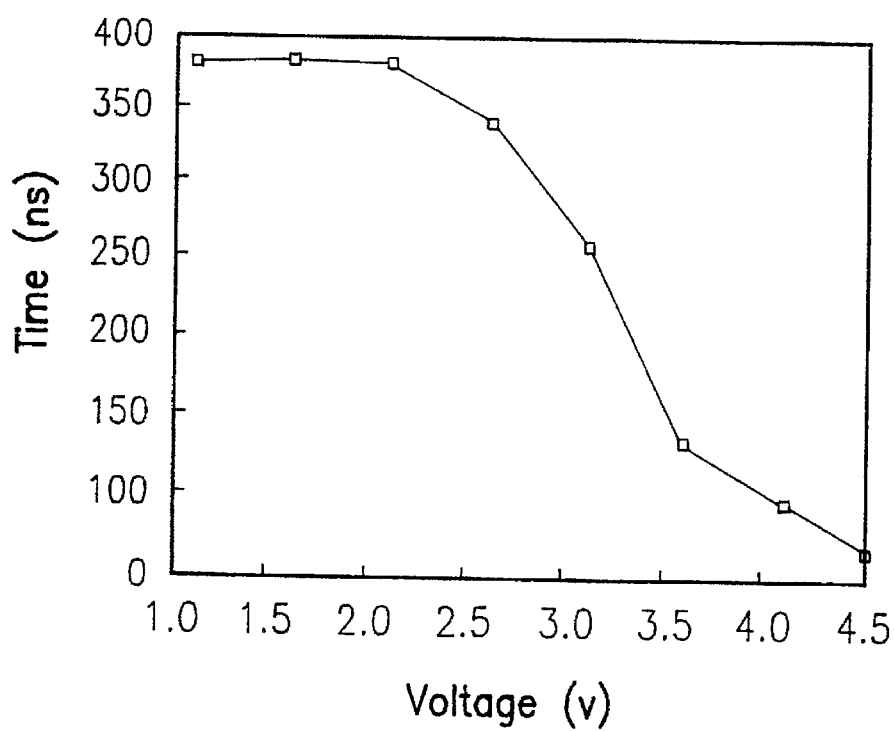
Figure 3C:
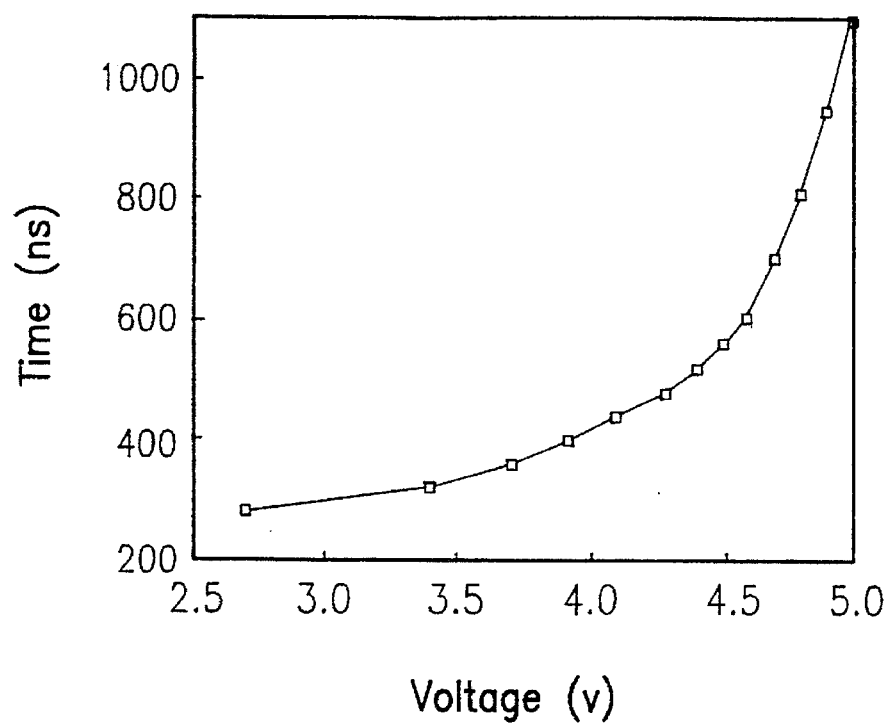

The testing result shows that the resolution accuracy of the winner-take-all subnet can reach 20 mV. The operation speed strongly depends on the input voltage difference of the input terminals, the whole input voltage level, and the bias voltage $V_p$ applied to the PMOS load transistors. The following testing result is for a three terminal network. Referring to FIG. 3a, the testing result shows that the convergence or competition time decreases approximately linearly with the increase of the input voltage difference. Referring to FIG. 3b, keeping the input voltage difference at a fixed value, the testing result shows that the convergence time decreases quickly with the increase of the whole input voltage level. Referring to FIG. 3c, the testing result shows that the convergence time decreases quickly with the reduction of the bias voltage $V_p$. The testing result of the winner-take-all subnet with different number of input and output terminals also shows that the convergence time increases slowly with the increase of terminal number. The reason is that in the present circuit design the convergence time mainly depends on the output load other than the load in the network itself.

Overview of the testing results gives the conclusion that the winner-take-all subnet has high resolution accuracy and can reach the convergence at least less than 200 ns. The resolution accuracy and convergence speed can be increased markedly if multiple layer metals, narrow line width technology, and multiple stage driving circuit are used.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A Hamming neural network circuit having N binary inputs and M exemplar template outputs, comprising:

a template matching calculation subnet including M first neurons in which M exemplar templates are stored respectively, each first neuron including N pull-up and pull-down transistor pairs connected in parallel with each other, said N pull-up and pull-down transistor pairs of each first neuron being connected to and controlled by said N binary inputs, respectively, so that said M first neurons generate M template matching signals depending on an amount of matching between said N binary inputs and said M exemplar templates stored in said M first neurons; and a winner-take-all subnet including M second neurons, each having a template competition node, a load element connected between a power source and said template competition node, and a competition circuit connected between said template competition node and ground; said M template competition nodes being connected to said M template matching signals respectively for generating said M exemplar template outputs, and said competition circuit of each second neuron including M-1 parallel-connected transistors controlled respectively by said template competition nodes of all second neurons except the template competition node of itself so that the template competition node connecting with the largest template matching signal is established at a high voltage level, and the other template competition nodes are at a low voltage level relative to the high voltage level, after competition.

2. The Hamming neural network circuit as claimed in claim 1, wherein said winner-take-all subnet further includes means for connecting said M template competition nodes with each other in order to balance their voltage levels before competition, and means for disconnecting said M template competition nodes from each other when competition proceeds.

3. The Hamming neural network circuit as claimed in claim 2, wherein said competition circuit of each second neuron further includes an additional parallel-connected transistor controlled by a predetermined threshold voltage, and wherein said winner-take-all subnet further includes an additional second neuron acting as a threshold neuron, the template competition node of said threshold neuron being connected to said threshold voltage during competition, and the M parallel-connected transistors of said threshold neuron being controlled respectively by the template competition nodes of all other second neurons, so that all exemplar template outputs are eventually at the low voltage level, after competition, if said threshold voltage is higher than the voltages of all template matching signals.

4. The Hamming neural network as claimed in claim 3, wherein said template matching calculation subnet includes means for inverting selected ones of said binary inputs of each first neuron, depending upon the exemplar template of each first neuron.

5. The Hamming neural network circuit as claimed in claim 4, wherein said load elements in said second neurons are MOS transistors controlled by a bias voltage.

* * * * *